Figure 9:
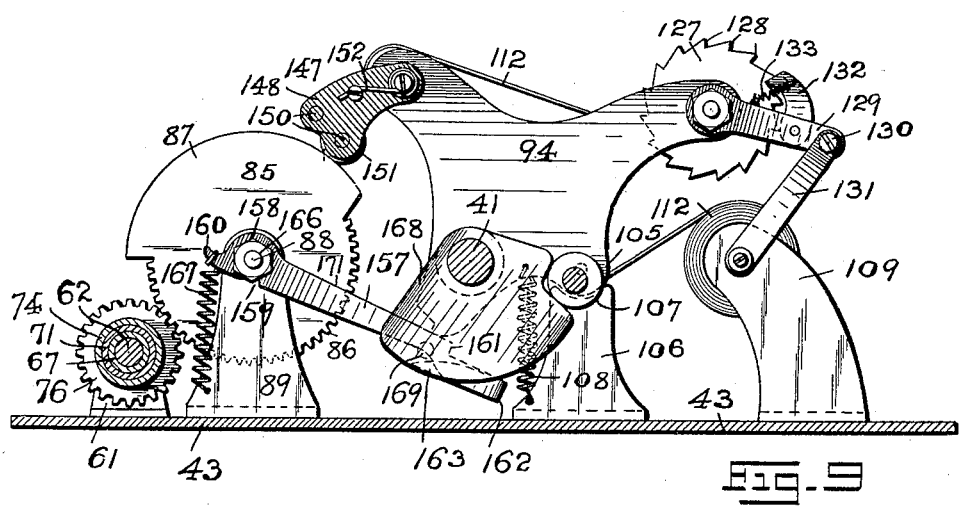

No. 721,916. PATENTED MAR. 3, 1903.
A. PFAFF.
CASH REGISTER.
APPLICATION FILED JUNE 7, 1902.
NO MODEL. 9 SHEETS—SHEET 1.
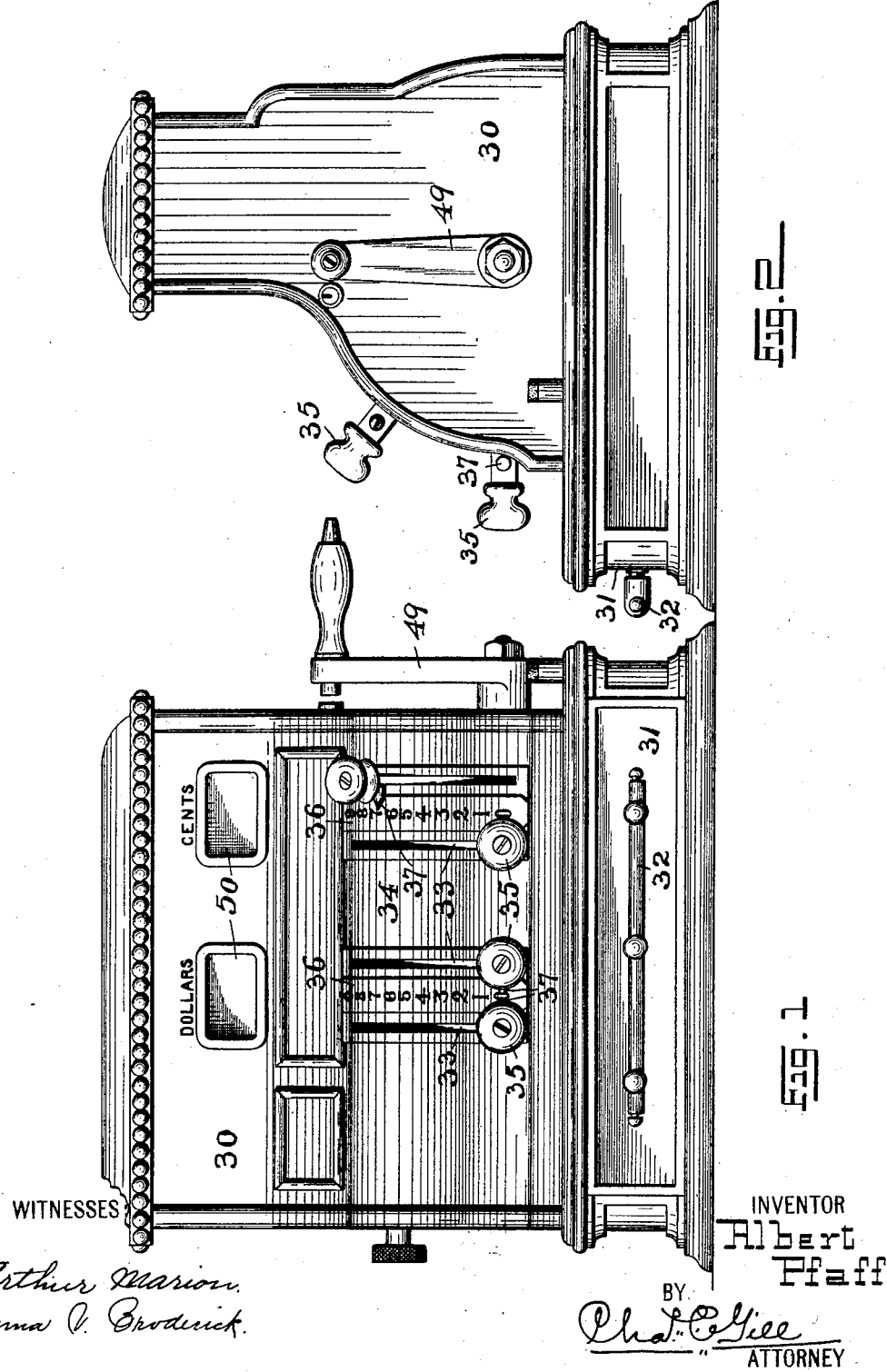
WITNESSES
Arthur Marion.
Anna V. Broderick.
INVENTOR
Albert Pfaff
BY
Chas. E. Gill
ATTORNEY

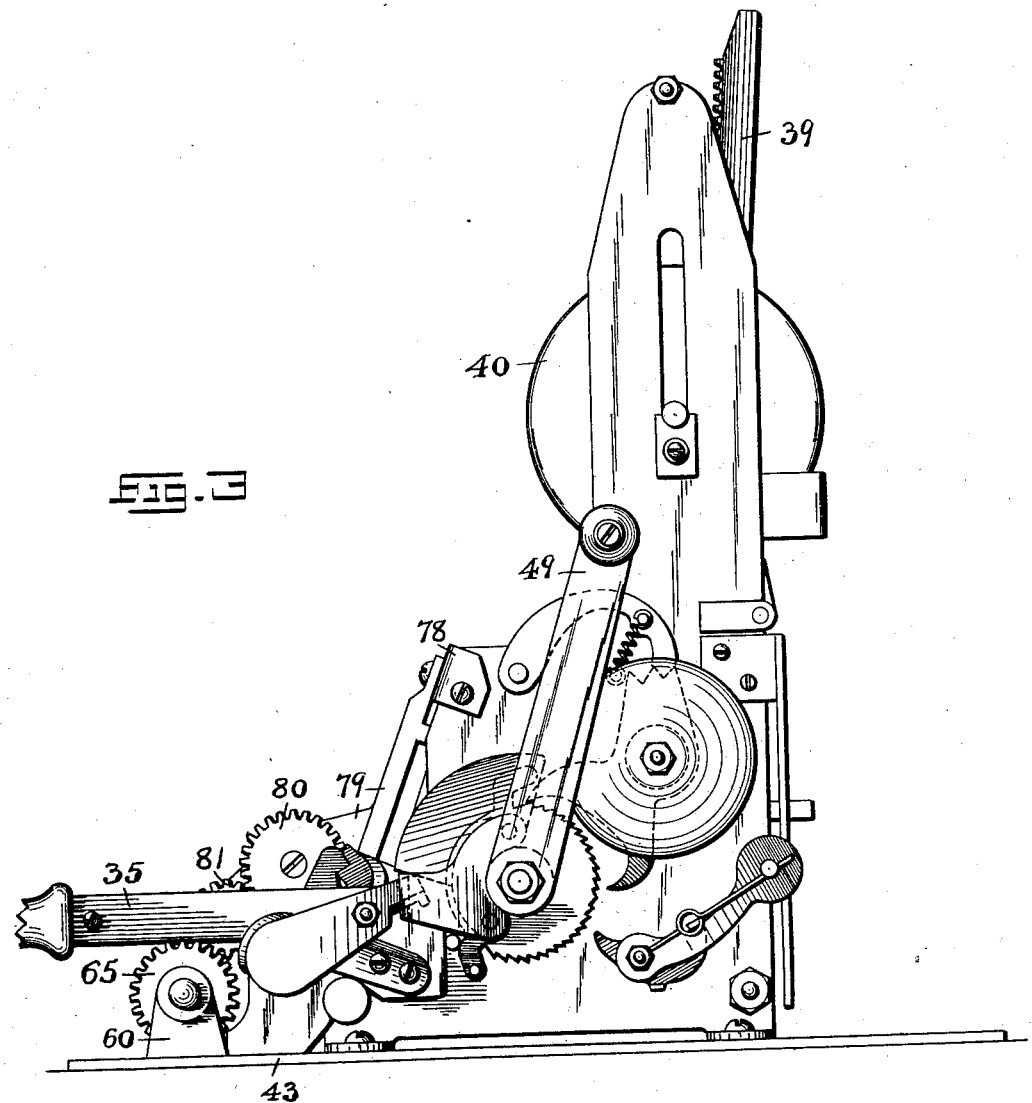

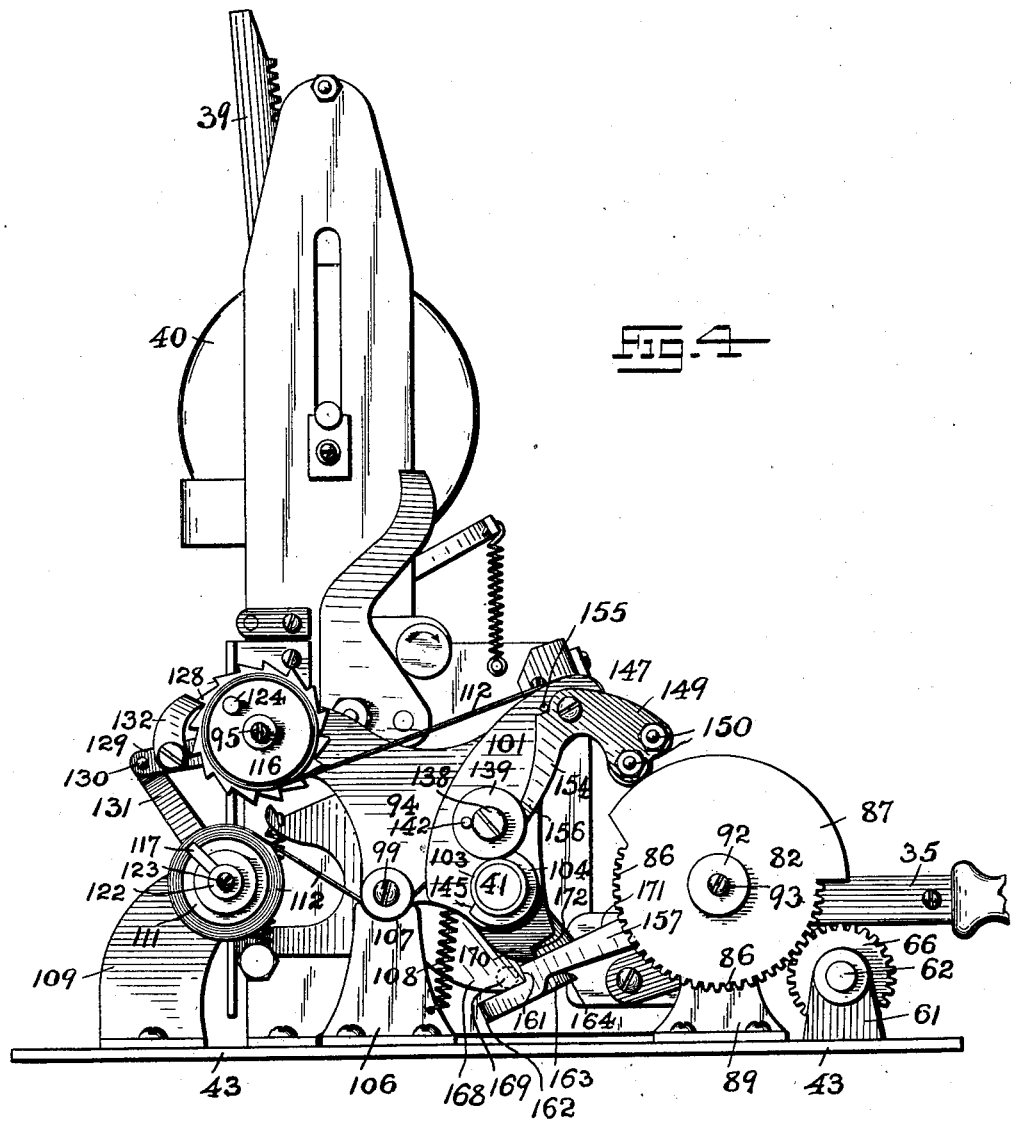

No. 721,916. PATENTED MAR. 3, 1903.
A. PFAFF.
CASH REGISTER.
APPLICATION FILED JUNE 7, 1902.
NO MODEL. 9 SHEETS—SHEET 4.
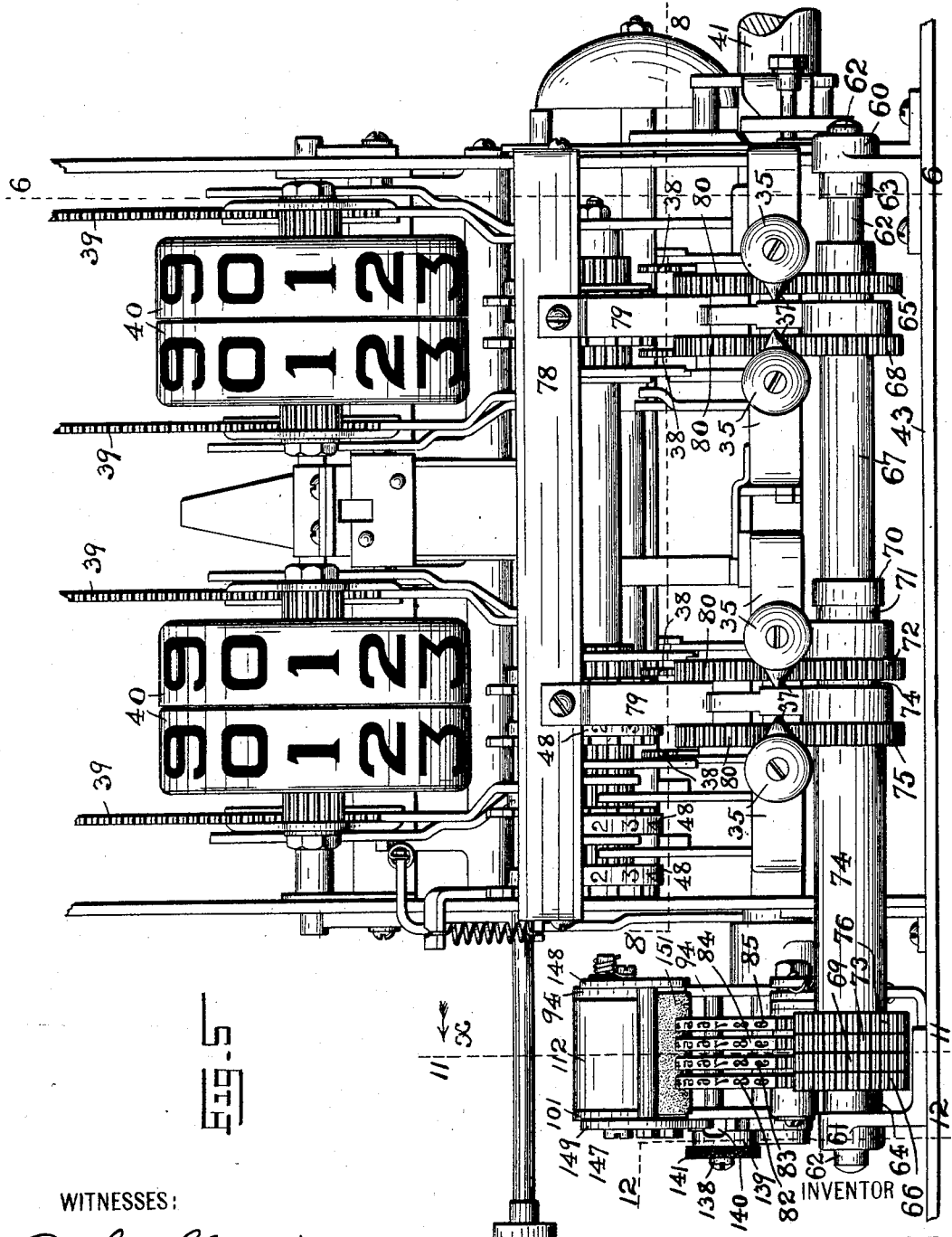
WITNESSES:
Arthur Marion.
Anna V. Broderick.
INVENTOR
Albert Pfaff
BY
Chas. P. Gill
ATTORNEY

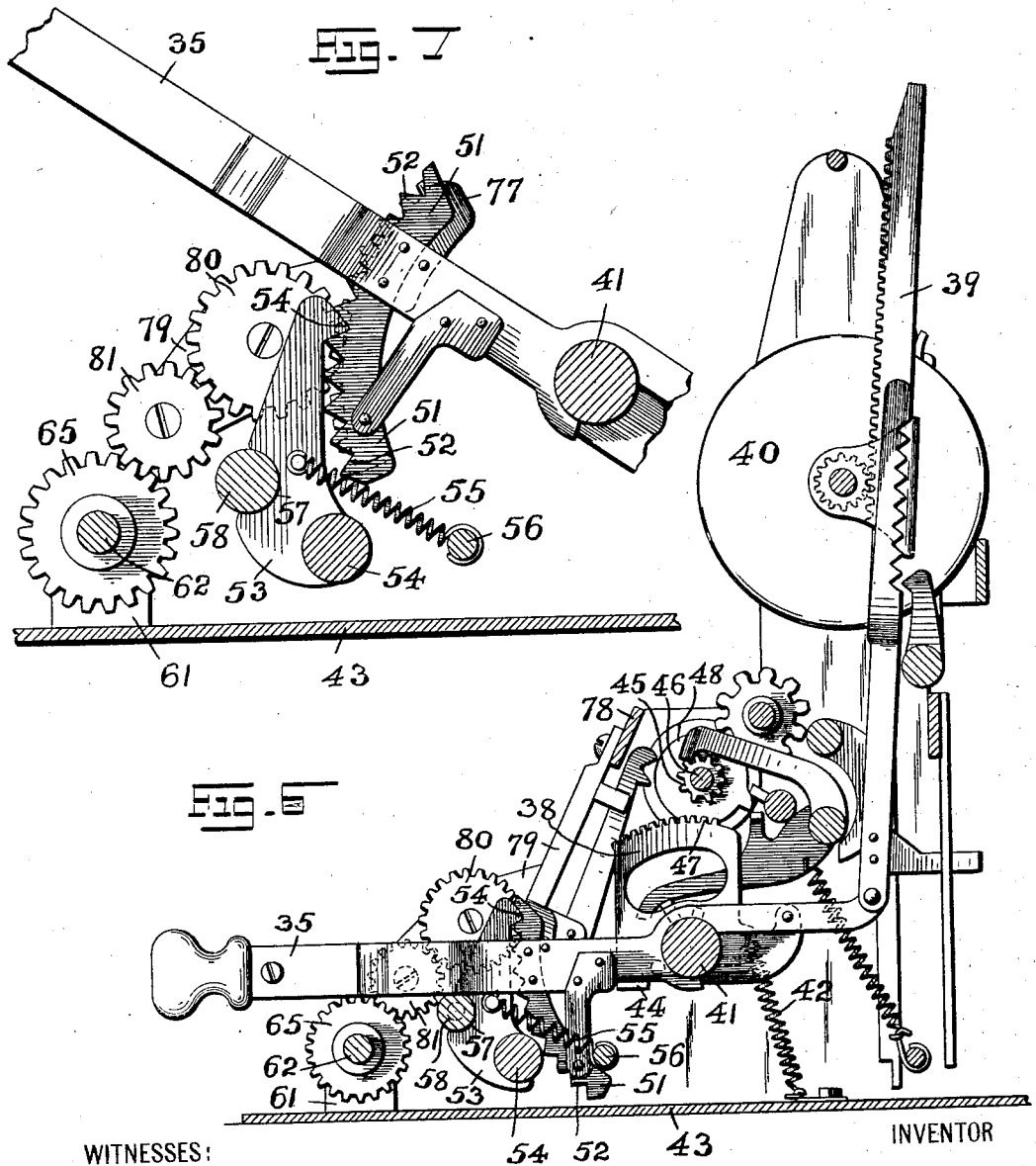

No. 721,916. PATENTED MAR. 3, 1903.
A. PFAFF.
CASH REGISTER.
APPLICATION FILED JUNE 7, 1902.
NO MODEL. 9 SHEETS—SHEET 6.
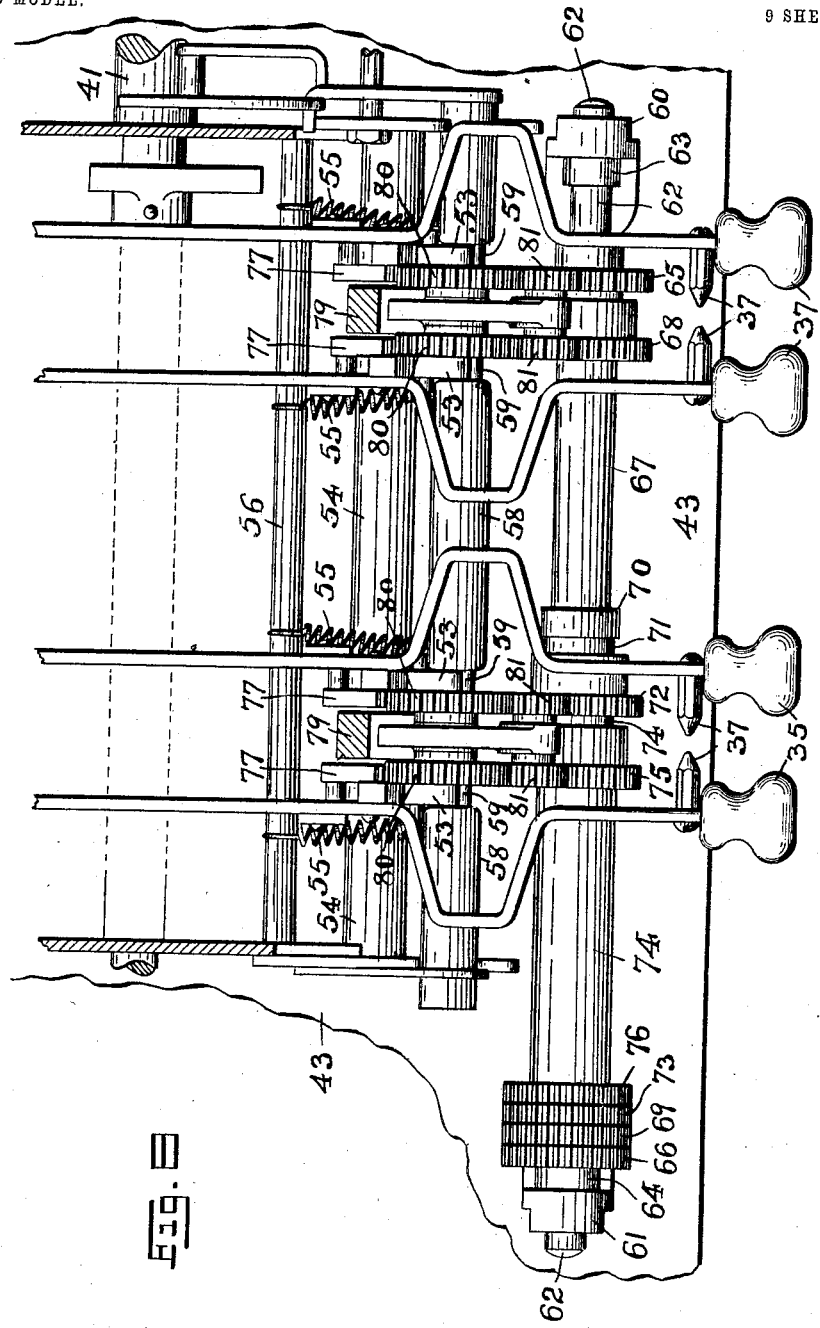
WITNESSES:
Arthur Marion.
Anna V. Broderick.
INVENTOR
Albert Pfaff
BY
Chas. C. Gee
ATTORNEY No. 721,916. PATENTED MAR. 3, 1903.
A. PFAFF.
CASH REGISTER.
APPLICATION FILED JUNE 7, 1902.
NO MODEL. 9 SHEETS—SHEET 8.
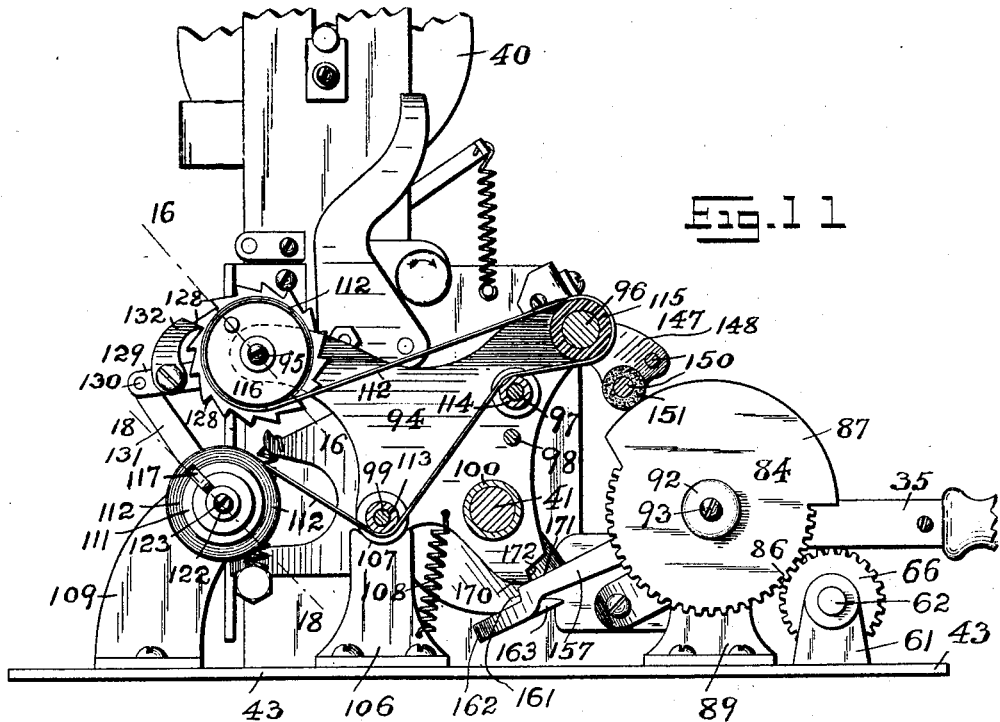
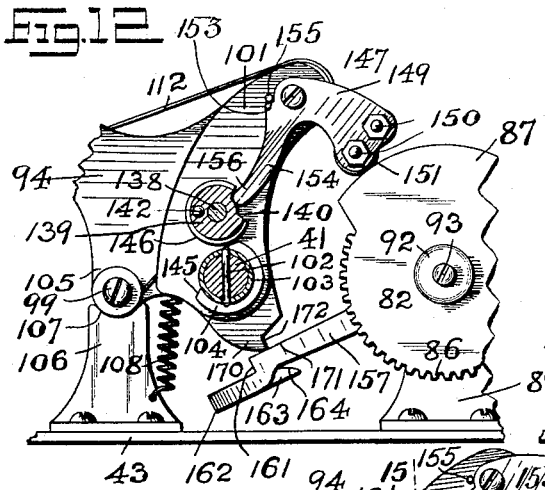
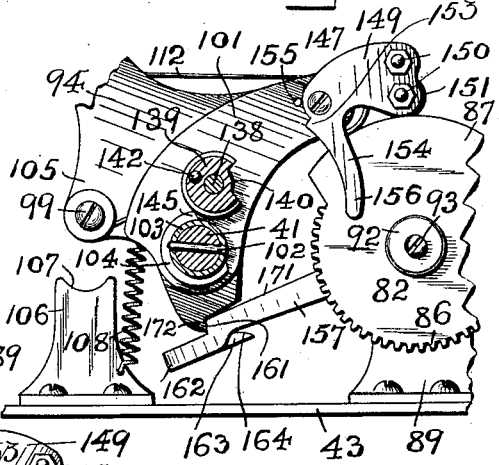
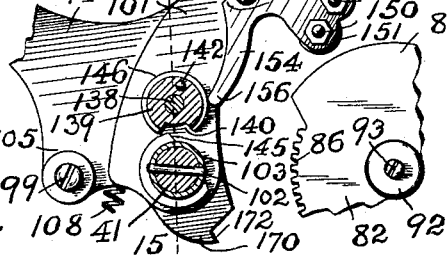
WITNESSES:
Arthur Marion
A. C. Broderick
INVENTOR
Albert Pfaff
BY
Chas. C. Gill
ATTORNEY

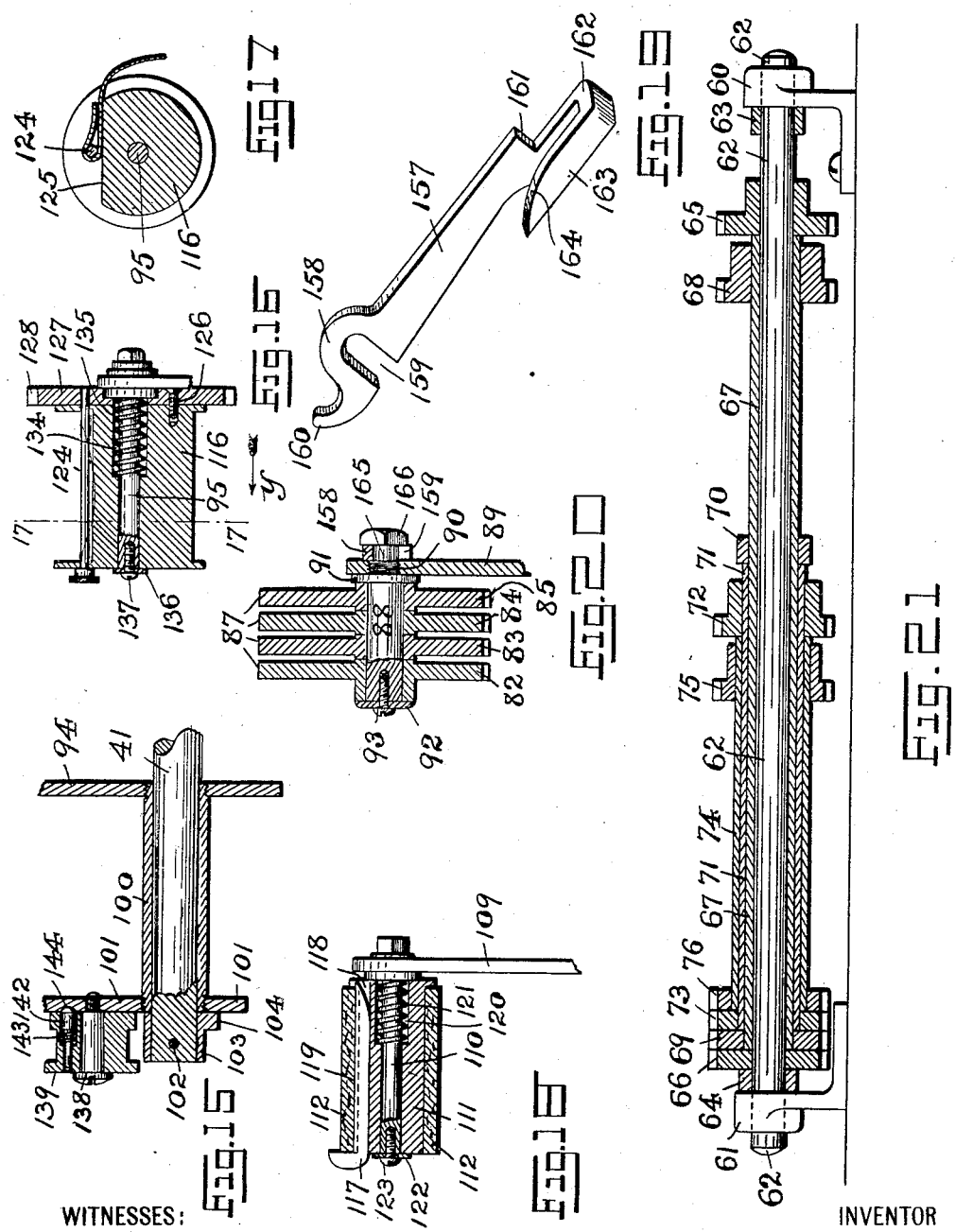

UNITED STATES PATENT OFFICE.

ALBERT PFAFF, OF NEW BOUNDBROOK, NEW JERSEY, ASSIGNOR TO IDEAL CASH REGISTER COMPANY, OF NEW BOUNDBROOK, NEW JERSEY, A CORPORATION OF NEW JERSEY.

CASH-REGISTER.

SPECIFICATION forming part of Letters Patent No. 721,916, dated March 3, 1903.

Application filed June 7, 1902. Serial No. 110,587. (No model.)

*To all whom it may concern:*

Be it known that I, ALBERT PFAFF, a citizen of the United States, residing at New Boundbrook, in the county of Middlesex and State of New Jersey, have invented certain new and useful Improvements in Cash-Registers, of which the following is a specification.

The present invention has reference generally to improvements in cash-registers; and the invention refers more particularly to improvements in cash-registers of the character set forth in United States Letters Patent granted July 9, 1901, to Elmer S. Smith and Harvey Giles; Nos. 640,825 and 640,966, granted January 9, 1900, to Elijah F. Spaulding, and No. 690,472, granted January 7, 1902, to E. S. Smith and Harvey Giles.

The present invention relates, primarily, to a novel tape actuating and printing mechanism by which are recorded the amounts of the different sales made when the operator moves the exposed actuating or setting levers along the lines of numerals provided upon the front face of the register-casing for the purpose of setting certain interior segments into proper operative relation to the register mechanism combined with such actuating or setting levers, the front plate having the series of slots along which said levers may be moved in accordance with the values to be indicated by the registering-wheels and to be printed on the tape and the necessary and intermediately-arranged mechanism for actuating the tape-feeding mechanism and causing the printing upon the said tape of the registered amount by the previously-set printing wheel or wheels, which are actuated and set simultaneously with the movement of the setting lever or levers.

A further object of my present invention is to provide simple and efficient mechanism, to be hereinafter more fully described, which may be regarded in the nature of an attachment that can be applied to existing forms of cash-registers and wherein little or no structural change in the machine itself is necessary in order to apply the attachment.

The nature of the invention and satisfactory means for carrying the same into effect are fully set forth in the following specification and are illustrated in the accompanying drawings, wherein like reference characters indicate corresponding parts in the various views, and in which—

Figure 10:
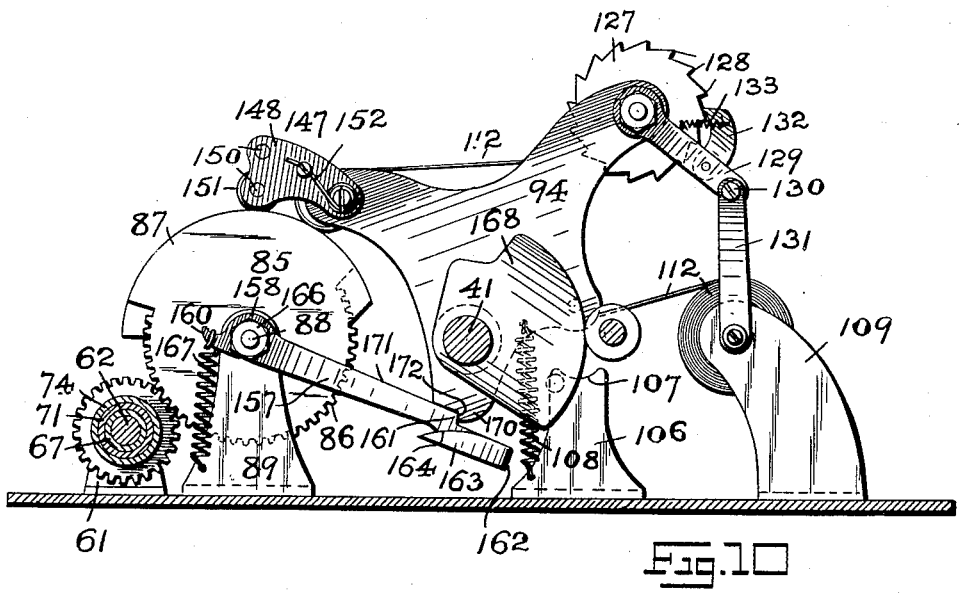

Figure 1 is a front view of a cash-register constructed in accordance with and embodying my present invention, and Fig. 2 is an end view of the same. Figs. 3 and 4 are the two end views of the interior mechanism of the cash-register, on an enlarged scale, the inclosing shell in each instance having been omitted. Fig. 5 is a front elevation, partly broken away, of the said interior mechanism, the register-casing in this view having also been omitted and the indicating cylinders or drums being represented in their lower or normally concealed positions. Fig. 6 is a vertical transverse section through the register, said section being taken on line 6 6 in said Fig. 5, the variously-arranged devices and parts of the said mechanism being represented in their initial normal positions; and Fig. 7 is a diagrammatical transverse sectional view of one of the actuating hand-levers and certain of the coöperating parts connected therewith for setting said lever and also an intermediate gear-train for actuating a sectional spindle or spindles with which a set of printing-wheels or disks is operatively connected to be correspondingly and simultaneously set with the movement of the hand-levers. Fig. 8 is a detailed horizontal section of certain portions of the mechanism, said section being taken on line 8 8 in said Fig. 5. Fig. 9 is a side elevation, on an enlarged scale, of the tape-feeding mechanism and the printing disks or wheels in their initial normal positions, the remaining portions of the register mechanism being omitted; and Fig. 10 is a similar view of the same devices, represented in their operated positions while printing a number upon the intermittently-moving tape. Fig. 11 is a central transverse section of the said tape-feeding mechanism and the printing disks or wheels in their initial normal positions, said section being taken on line 11 11 in said Fig. 5 looking in the direction of the arrow $x$ in said Fig. 5. Fig. 12 is a diagrammatical transverse section, taken on line 12 12 in said Fig. 5, of portions of the tape carrying and feeding mechanism and a portion of one of the printing-disks, the said parts being represented in their normally inoperative positions. Fig. 13 is a similar section of the same parts, represented in their actuated relation while printing; and Fig. 14 is a diagrammatical representation of the same parts, but representing the tape-bearing cradle raised in its inactive relation to the printing disks or wheels to enable the operation of the main registering mechanism of the cash-register without printing any figures or numbers upon the tape. Fig. 15 is a longitudinal vertical section taken on line 15 15 in said Fig. 14. Fig. 16 is a longitudinal section taken on line 16 16 in Fig. 11. Fig. 17 is a cross-section on line 17 17 in Fig. 16, and Fig. 18 is a longitudinal section taken on line 18 18 in Fig. 11. Fig. 19 is a perspective view of a spring-controlled holding lever or arm for holding the tape-carrying frame or cradle in its actuated and immovable position during the time of printing. Fig. 20 is a vertical section of a set of printing wheels or disks; and Fig. 21 is a longitudinal vertical section of a sectional spindle for independently actuating any one or more of the said printing disks or wheels, as will hereinafter appear.

I have shown my invention applied to a cash-register of the type represented in United States Letters Patent No. 677,896, granted July 9, 1901, to E. S. Smith and H. Giles, though obviously the invention may be applied to other characters of cash-registers and various changes in the construction may be made to facilitate such application.

Referring now to the drawings, the reference character 30 indicates the exterior shell or casing of the register, and 31 the cash-drawer, provided with a suitable handle or pull-piece 32, substantially as illustrated in Figs. 1 and 2. Extending through suitably-arranged slots or openings 33, formed in the front plate 34 of the register, as shown in said Figs. 1 and 2, are a set of actuating or setting levers 35, each lever being movable in its slot or opening 33, so as to be set along the sides of the columns of numerals 36, ranging from "0" to "9," inclusive, and to be held in their set positions by the mechanism illustrated more particularly in Figs. 6 and 7 of the drawings. The initial position of each actuating-lever 35 is at the lower end of its respective slot or opening 33 in the front plate, as indicated in Fig. 1 of the drawings, and when it is desired to register and indicate the amount of a sale the said levers (one or more, as may be necessary) are moved upward to the proper position along the line of said slots under the guidance of the columns of numerals 36 on the front plate 34, each lever being preferably provided with a pointer 37, as clearly illustrated in Figs. 1 and 8 of the drawings. The said actuating-levers 35 during the upward motion perform the two main functions of first "setting" the segments 38, and then through vertical racks 39 actuating or setting the indicating cylinders or drums 40. The said segments 38 are loosely mounted upon the main driving-shaft 41 and automatically follow the actuating-levers 35 under the influence of the coiled springs 42, whose upper ends are secured to a suitable part of the segments and whose lower ends are secured to the flooring or base-plate 43, on which the cash-register mechanism is placed, as clearly indicated in Fig. 6 of the drawings. Each lever 35 is accompanied by such a segment 38, and each segment is adapted to have an independent motion and is equipped with one of said springs 42, the normal tendency of the springs being to exert a pull upon the segments and keep them in condition to automatically follow the levers 35 when the latter are elevated. Suitably-formed laterally-extending lips 44 afford a surface for contact with the lower edges of the respective levers 35 to return the segments to the initial normal positions when the levers are again returned to their normally inactive positions. The said actuating-levers 35 turn freely upon the said main shaft 41, and likewise the said segments 38 turn freely upon the said shaft. The said segments 38 during the return to their initial normal positions effect, through a set of pinions 45 on a spindle or shaft 46, which are brought in operative engagement with the gear-teeth 47 of the segments 38, the movements of the registration wheels or disks 48. The detailed arrangements and construction of the various parts of this means or mechanism for effecting the registration and its operation are fully shown and described in the said Letters Patent No. 677,896, hereinabove mentioned. The means for raising and permitting the lowering of the indicating cylinders or drums 40 is also fully set forth in the said Letters Patent No. 677,896 and will therefore not be further described here. Suffice it to say here, however, that the initial upward movement of the actuating-levers 35 results in the turning of the indicating cylinders or drums 40 to bring into alinement the proper numerals thereon to indicate the amount of a sale; but said numerals are substantially concealed until such time as the exposed operating crank or handle 49 at the end of the main driving-shaft is lowered to thereby actuate the registration mechanism and effect the registration and also effecting the elevation of the said indicating cylinders or drums 40 to their upper positions, when the proper numeral indicating the sale or purchase is observable through the window-openings 50 in the front of the cash-register casing. The actuating or setting levers 35 are locked against movement except when the said crank or handle 49 is in its upper normal position. (Indicated in Figs. 1 and 2 of the drawings.) The means for locking the setting-levers 35 against movement comprise a series of segmental racks 51, provided, preferably, with V-shaped teeth 52, which are in normal sliding relation with the correspondingly-shaped studs or projections 54 of suitably-disposed holding-dogs or detents 53. The dogs 53 extend from an oscillating shaft or rod 54 in the framework of the apparatus, and suitable coiled springs 55, connected with the said dogs 53 and a rod or bar 56, cause the normal sliding engagement of each stud or projection 54 with the teeth of the respective racks 51 of the respective levers 35. Each dog or detent 53 is made with a curved cut-away portion 57, which normally rests over one of the annular recesses or grooves 59 in a rod 58, which is arranged to slide laterally in suitable bearing portions in the frame of the apparatus. When these parts are in the positions indicated in Fig. 8, then a vibratory movement of the said dogs or detents is permitted, and the upward movements of the setting-levers 35 are not interfered with. Now as soon as the exposed handle 49 is moved from its normally vertical position to another position the said rod 58 is moved in a lateral direction, whereby the said recesses or grooves 59 are withdrawn from their relative position directly in front of the cut-away portions 57 of the dogs or detents 53, said portions 57 then closely hugging the larger cylindrical surface portions of the said rod 58, whereby the vibratory motions of the said dogs or detents 53 are prevented, and in consequence thereof the levers 35 are locked in their set positions until the crank or handle 49 has again been returned to its vertical position, thereby returning the rod or bar 58 to its initial normal position and allowing the "set" actuating-levers to be returned to their "zero" positions.

Having thus in a general way described the mechanism and manner of actuating the main registering and indicating devices of the cash-register, I will now endeavor to set forth the general arrangement and construction of and the manner of operating the intermittent tape-feeding mechanism and the manner of printing the numerals indicating the sales directly upon the tape.

Referring now more particularly to Figs. 5, 6, 7, 8, and 21, it will be seen that I have secured upon the base-plate 43 in any suitable manner a pair of bearing-brackets 60 and 61, in which is rotatably arranged a main central spindle 62, held against lateral displacement in the bearing portions of said brackets 60 and 61 by means of collars 63 and 64, which may be suitably secured on said spindle 62 in any desired manner. Suitably secured at or near the one end portion of the said spindle 62 is a toothed pinion 65, while at its opposite end portion the said spindle 62 is provided with a gear or toothed wheel 66. Loosely and rotatably arranged upon the said main spindle 62 directly between the pinion 65 and said wheel 66 is a tubular spindle 67, which is provided near its one end with a pinion 68 and at its opposite end with a toothed wheel 69. Loosely and rotatably arranged upon this tubular spindle 67 between the said wheel 69 and a collar 70 on said spindle 67 is another spindle 71, which is likewise provided with a toothed pinion 72 at its one end and with a gear or toothed wheel 73 upon its opposite end, and loosely and rotatably arranged upon the said tubular spindle 71 between the said pinion 72 and the gear 73 is another tubular spindle 74, having a pinion 75 and a toothed wheel or gear 76 suitably secured at its respective end portions, all substantially as illustrated. To produce the independent rotatable movements of the respective spindles 62, 67, 71, and 74 and through their respective gears 66, 69, 73, and 76, providing the independent rotary movements of a set of printing disks or wheels, to be presently described, according to the motions of the respective levers 35 when setting the said levers, I have provided each lever 35, as indicated more particularly in Fig. 7, with a toothed segmental rack 77. Suitably secured to the frame portion 78 of the device (see Figs. 5 and 6) are downwardly and forwardly extending brackets or frame-pieces 79, each bracket being provided with a loosely and rotatively arranged gear 80 in operative mesh or gear with a rack 77. Upon each bracket 79 is also a loosely-rotatable idler 81, the said idlers 81 being respectively in operative mesh with the said respective gears 80 and the pinions 65, 68, 72, and 75 of the respective spindles 62, 67, 71, and 74. It will thus be clearly evident that no matter which one of the actuating or setting levers 35 is moved in an upward direction to effect the registering and indication of the amount of sale the corresponding spindle 62, 67, 71, or 74 and corresponding gear 66, 69, 73, or 76 will also receive a corresponding motion, whereby any one or more of a set of printing disks or wheels 82, 83, 84, and 85 will in like manner be set and the corresponding numerals on said set disks or wheels will be presented, first, to be inked by an inking pad or roll, and, secondly, to print the numeral or numerals on the tape of the tape-feeding device in the manner to be presently more fully described. Each disk or wheel 82, 83, 84, and 85 is provided with a reduced segmental portion bearing the gear-teeth 86 in operative mesh with the gear-teeth of the respective gears 66, 69, 73, and 76 and with the enlarged segmental edge portions 87, as represented in the several figures of the drawings, upon the peripheral surface of which are arranged the printing-numerals from "0" to "9," inclusive. The said disks are loosely and rotatively arranged upon a suitable pin 88, extending laterally from the side of a bracket 89, which is suitably secured upon the base-plate 43, the said pin 88 being preferably screwed in place, as illustrated in Fig. 20, by means of a screw portion 90, and the printing-disks are operatively retained in place on said pin 88 by means of a shoulder 91 and a washer 92 and screw 93; but it will be understood that these parts may be otherwise retained in their operative relation on said pin 88. The tape-carrying device and the means for intermittently feeding the tape from a tape-receiving roll directly above the said printing-disks on wheels to be printed and upon a receiving-roll upon which the tape is reeled after having been printed upon is clearly represented in Figs. 4, 9, 10, 11, 12, 13, and 14, and said device consists, essentially, of an oscillating cradle or frame comprising a side frame-piece 94, provided with the laterally-extending pins 95, 96, 97, 98, and 99, all for the purposes to be presently more fully described. The main operating-shaft 41 extends beyond the left-hand side piece of the main frame of the machine, and upon this extending portion of said main shaft the said frame-piece 94 is arranged, so as to oscillate thereon in the manner to be presently described. Extending laterally from the said side plate 94 and loosely arranged directly upon the said extending portion of the said main operating-shaft 41 is a sleeve 100, and attached to or connected with the opposite end of the said sleeve 100 and with the laterally-extending pins 96, 97, 98, and 99 in any suitable manner is a second side piece or frame 101, preferably of the configuration represented more particularly in Figs. 12, 13, and 14. In this manner a suitable rack or oscillating cradle has been provided, which is movable upon and with the movement of the said main shaft 41, but only at certain times of the movements of the said shaft. Suitably secured upon the extreme free end of the said shaft 41 by means of a pin 102 or in any other desirable manner is a cam or other suitably-shaped collar or collars 103, having on a portion of its cylindrical surface a projection 104, substantially as illustrated and for the purpose to be presently more particularly set forth. The said side piece 94 of the cradle is provided with a downwardly-extending and preferably-rounded portion, as 105, which normally rests upon the curved end portion 107 of a pedestal or support 106, suitably arranged and secured upon the base-plate 43, a spring 108 being employed for causing said portion 105 under normal conditions to rest directly upon the said support 106 and cause the cradle to assume the normally inoperative positions indicated in said Figs. 11, 12, and 13. Suitably arranged upon a pin 110, which extends from a bracket 109, suitably secured upon the base-plate 43, near the rear edge of said plate, is a tape reel or roll 111, upon which the roll of tape 112 is arranged and its end portion then passed beneath a guide-roll 113, suitably arranged upon the pin 99, which is connected with the side frame 94. The tape is then passed over a suitable guide-roll 114 upon the pin 97 and then directly beneath and around a roll 115, which might be termed the "printing-roll," and in a rearward direction upon a tape-receiving reel 116, arranged upon the pin 95. The tape-roll 112 is suitably arranged upon the reel or roll 111 in its operative position, preferably by means of a suitably-constructed key 117, which is slipped into a slot 118 in said reel or roll 111 and binds the roll of paper or tape in position upon the said reel or roll 111 by bringing the edge 119 of said key 117 in positive holding contact with the inner portion of the roll of tape, as clearly illustrated in Fig. 18. To provide a sufficient tension on the roll of tape and prevent undue and accidental unwinding, the said reel or roll 111 is preferably made with a socket-like portion 120, forming a chamber in which may be placed a compression-spring 121, which encircles a portion of the central pin 110 and forces the said roll or reel 111 with sufficient force against a washer or disk 122, secured to the free end of said pin 110 by means of a screw 123, substantially as illustrated. In this manner the proper tension is placed upon the roll of tape without in the least interfering with the unwinding or reeling off of the tape as used. The opposite and free end of the tape is suitably secured upon the reel 116 by being placed around a pin 124 and a flat portion 125 of said reel 116, substantially as illustrated in Fig. 17, and where the end of the tape is held by frictional contact. At one side the said reel or roll 116 has secured thereto, by means of screws 126 or in any other manner, a disk 127, provided with ratchet-teeth 128. Pivotally arranged upon the inner end portion of the said pin 95 is a link 129, having pivotally attached upon a pin 130 at its opposite end a second link 131, which in turn is pivotally connected at its lower end with the pin 110. Pivotally connected with the link 129 is a detent or dog 132, which is brought in normal sliding engagement with the ratchet-teeth 128 of the disk 127 by means of a spring 133, as illustrated. Thus it will be clearly understood that when the tape-carrying device has been brought in its printing position (indicated in Fig. 10) the spreading arrangement of the two links 129 and 131 will have moved the actuating-dog 132 in engagement with the next lower tooth of the disk 127, whereby upon the upward return of the tape-carrying device the said reel 116 will receive a sufficient rotary motion to reel a sufficient portion of the tape on said reel and bring another portion of the tape in its printing position upon the roll 115. The said reel 116 is likewise provided with a receiving-socket 134 for the reception of a compression-spring 135, which causes the reel 116 to be slightly pressed against a washer or disk 136, held against the free end of the pin 95 by a screw 137 or in any other suitable manner, and whereby a sufficient tension is also brought upon the reel 116 to keep the tape at all times sufficiently taut so as not to interfere with the printing upon the tape. Suitably secured upon the outer surface of the frame-piece 101, in approximate vertical alinement with the main shaft 41 and the cam sleeve or collar 104, is a screw-pin 138, on which is adjustably arranged collar 139, provided with a recess 140 and a knurled edge 141, forming a finger-piece for turning said collar 139 upon the pin 138 when desired. Normally the shaft 41 and collar or sleeve 103, as well as the collar 139, are in the positions indicated in Fig. 12, the said collar 139 being held in its fixed position on the pin 138 by means of a suitable key 142 and spring 143, the end of said key being forced by means of said spring 143 into a suitable depression 144 in the side of the frame-piece 101, as illustrated in Fig. 15 of the drawings. Now when the shaft 41 is turned by means of the crank or handle 49, any one of the setting-levers 35 having been previously set, and whereby the corresponding printing disk or disks have also been set in their printing positions, the said shaft 41 will move or turn until the edge 145 of the projection 104 of said cam-sleeve 103 is brought in active engagement with the cylindrical portion 146 of the collar 139. This engagement of the parts 145 and 146 now causes a swinging or rocking motion of the tape-carrying device or cradle, whereby its forward portion bearing the printing-roll 115 and the tape is moved directly down upon the printing-surface of the previously-set printing-disks. Pivotally connected with the said pin 96, but on its outer end portions extending beyond the outer surfaces of the side pieces 94 and 101, is a frame or saddle 147, comprising the two side pieces 148 and 149 and the connecting tie-bolts 150, one of which is provided with an inking roller or pad 151. A spring 152 on the outer surface of the side piece 148 forces the said frame or saddle 147 in its downward position, (indicated in Figs. 11 and 12,) with the inking pad or roller 151 in its rolling and inking relation with the printing portions of the printing-disks 82, 83, 84, and 85. At the same time the said spring 152 forces a projection 153, formed on a downwardly-extending arm 154, against a stop 155, extending from the side of the frame-piece 101, while the lower end 156 of said arm extends directly into the recess 140 of the collar 139. When these various parts are in the relative positions just described and the tape-bearing device or cradle is lowered, then the said frame or saddle 147 will move from the position indicated in Fig. 12 to that represented in Fig. 13, whereby the inking-roll 151 will be rolled out of the way and at the same time will spread the ink upon the printing characters on said printing-disks, as will be clearly understood from an inspection of the said Figs. 12 and 13, and the amount of the sale or purchase is printed upon the tape. As an extra precaution to immovably lock or hold these various parts in fixed or positive positions during the time of printing I employ a peculiarly-constructed locking or holding lever 157, (see more particularly Fig. 19,) which is made with a yoke-shaped end portion 158, having a slot 159 and a slightly-curved upwardly-extending holding-end 160. At its opposite end portion the said arm or lever 157 is made with an offset 161 and a part 162 which is bent or doubled upon itself, substantially as illustrated, and provides a rearwardly-extending finger 163, having the upper curved edge 164. When in its initial normal position, the said slot 159 of the said arm or lever 157 is fitted directly over an end portion 165 of the pin or spindle 88, being held in place against lateral displacement by the side of the bracket 89 and a nut 166 on said portion 165, as illustrated in Fig. 20. A spring 167 is attached at its one end to said holding end 160 of said lever or arm 157 and at its other end to the base-plate 43, thereby causing (under normal conditions) the upper curved edge 164 of the finger 163 to be in close sliding contact with a pin or projection 169 on the side of a disk 168 on the main shaft 41, as indicated in Figs. 4, 9, and 10. At the same time a projection 170 is directly in sliding contact with the upper edge 171 of the arm 157. When, however, the main shaft 41 has been operative in the manner previously stated, then the pin or projection 169 of the disk 168 has moved away from its engagement with the edge 164 of the finger 163, and the projection 171 having moved beyond the offset 161 of said lever or arm 157 the spring 167, exerting a downward pull on the member 160, will cause the remaining main body portion of the lever or arm 157 to move in an upward direction, and thereby cause an offset 172 on the frame-piece 94 to register with the offset 161 of said lever or arm 157, and thereby hold the mechanism in a fixed position while printing, as clearly indicated in said Fig. 13. The return movement of the disk 168 causes the pin or projection 169 to again ride upon the curved edge 164 of the finger 163, whereby the offset 161 on said arm 157 will be released from its holding engagement with the offset 172 upon the frame-piece 94, and when the said pin or projection 169 has reached the position indicated in Fig. 9 then the said arm 157 will be in its normal and released position. When it is desired to use the cash-register mechanism without the tape-printing devices, then by turning the collar 139 by hand on said pin or screw 138 to the position represented in Fig. 13 it will be seen that the cylindrical surface 146 of said collar 139 engages the end 156 of the arm 155 of the frame or saddle 147, whereby the latter is sufficiently raised to bring the inking roller or pad 157 away from its operative contact with the printing-disks. The recess 140 of said collar 138 now being in the position shown in said Fig. 14, it will also be clearly evident that the rib portion 104 will pass directly through said recess 140, when the main shaft 41 is operated without actuating the tape-bearing device, the same remaining in such inoperative position until the collar 139 is again returned by the operator to its former position, (indicated in said Figs. 12 and 13.)

It is not intended to limit my invention to the exact arrangements and combinations of the devices and their parts as herein described and as illustrated in the accompanying drawings, for I am fully aware that various changes may be made without departing from the spirit of my present invention.

Having thus described my invention, what I claim is—

1. In a cash-register, the actuating hand-levers, the front plate having a series of slots along which said levers may be moved in accordance with the values to be indicated, the movable segments substantially independent of but adapted to automatically follow said levers and to have their positions controlled thereby, the registering-wheels, and the indicating-cylinders, combined with a main operating-shaft, a tape-carrying device on one end of said main shaft, a series of printing-disks, the movements of which are controlled by the setting of said hand-levers, and means on said main shaft adapted to engage the said tape-carrying device to bring the tape into printing relation against the printing-disks, substantially as and for the purposes set forth.

2. In a cash-register, the actuating hand-levers, the front plate having a series of slots along which said levers may be moved in accordance with the values to be indicated, the movable segments substantially independent of but adapted to automatically follow said levers and to have their positions controlled thereby, the registering-wheels, and the indicating-cylinders, combined with a main operating-shaft, a tape-carrying device on one end of said main shaft, a series of printing-disks, the movements of which are controlled by the setting of said hand-levers, and means on said main shaft adapted to engage the said tape-carrying device to bring the tape into printing relation against the printing-disks and means connected with said tape-carrying device for producing an intermittent movement of the said tape after each printing act, substantially as and for the purposes set forth.

3. In a cash-register, the actuating hand-levers, the front plate having a series of slots along which said levers may be moved in accordance with the values to be indicated, the movable segments substantially independent of but adapted to automatically follow said levers and to have their positions controlled thereby, the registering-wheels, and the indicating-cylinders, combined with a main operating-shaft, a tape-carrying device on one end of said main shaft, a series of printing-disks, the movements of which are controlled by the setting of said hand-levers, and means on said main shaft adapted to engage the said tape-carrying device to bring the tape into printing relation against the printing-disks, and means connected with said tape-carrying device for producing an intermittent movement of the said tape after each printing act, comprising a bracket and a tape-delivering reel, a tape-receiving reel, a ratchet-disk connected with said tape-receiving reel, a pair of movably-connected links between said reels, and a spring-controlled dog on one of said links in engagement with said ratchet-disk for producing a step-by-step motion of said tape-receiving reel, substantially as and for the purposes set forth.

4. In a cash-register, the actuating hand-levers, the front plate having a series of slots along which the said levers may be moved in accordance with the values to be indicated, the movable segments substantially independent of but adapted to automatically follow said levers and to have their positions controlled thereby, the registering-wheels, and the indicating-cylinders, combined with a main operating-shaft, a tape-carrying device on one end of said main shaft, a series of printing-disks, the movements of which are controlled by the setting of said hand-levers, and means on said main shaft adapted to engage the said tape-carrying device to bring the tape in its printing relation against the printing-disks consisting, essentially, of a sleeve 139 at the side of said tape device, and a cam-sleeve on said main shaft having a projection adapted at a predetermined time to be brought in positive and operative engagement with said sleeve 139, substantially as and for the purposes set forth.

5. In a cash-register, the actuating hand-levers, the front plate having a series of slots along which the said levers may be moved in accordance with the values to be indicated, the movable segments substantially independent of but adapted to automatically follow said levers and to have their positions controlled thereby, the registering-wheels and the indicating-cylinders, combined with a main operating-shaft, a tape-carrying device on one end of said main shaft, a series of printing-disks, the movements of which are controlled by the setting of said hand-levers, and means on said main shaft adapted to engage the said tape-carrying device to bring the tape in its printing relation against the printing-disks and means adapted to be brought in holding engagement with a portion of said tape-carrying device during the printing operation, substantially as and for the purposes set forth.

6. In a cash-register, the actuating hand-levers, the front plate having a series of slots along which said levers may be moved in accordance with the values to be indicated, the movable segments substantially independent of but adapted to automatically follow said levers and to have their positions controlled thereby, the registering-wheels, and the indicating-cylinders, combined with a main operating-shaft, a tape-carrying device, on one end of said main shaft, a series of printing-disks, the movements of which are controlled by the setting of said hand-levers, and means on said main shaft adapted to engage the said tape-carrying device to bring the tape in its printing relation against the printing-disks and means consisting essentially of a spring-controlled arm 157, having a slotted yoke portion 158, and an offset adapted to be brought in holding engagement with a portion of said tape-carrying device during the printing operation, substantially as and for the purposes set forth.

7. In a cash-register, the actuating hand-levers, the front plate having a series of slots along which said levers may be moved in accordance with the values to be indicated, the movable segments substantially independent of but adapted to automatically follow said levers and to have their positions controlled thereby, the registering-wheels and the indicating-cylinders, combined, with a main shaft, a series of independently-acting spindles at the front of the machine, a pinion connected with each spindle, a toothed rack connected with each lever, an intermediately-arranged train of gears between each pinion of said spindles and the rack of each hand-lever, a toothed wheel, connected with each spindle, and a toothed printing-disk in mesh with each toothed wheel of said spindles, an oscillating tape-carrying device and means connected with said main shaft adapted to engage with the said tape-carrying device to bring the tape in its printing relation against the printing-surfaces of said printing-disks, substantially as and for the purposes set forth.

8. In a cash-register, the actuating hand-levers, the front plate having a series of slots along which said levers may be moved in accordance with the values to be indicated, the movable segments substantially independent of but adapted to automatically follow said levers and to have their positions controlled thereby, the registering-wheels and the indicating-cylinders, combined with a main shaft, a series of independently-acting spindles at the front of the machine, a pinion connected with each spindle, a toothed rack connected with each lever, an intermediately-arranged train of gears between each pinion of said spindles and the rack of each hand-lever, a toothed wheel connected with each spindle, and a toothed printing-disk in mesh with each toothed wheel of said spindles, an oscillating tape-carrying device, and means connected with said main shaft adapted to engage with the said tape-carrying device to bring the tape in its printing relation against the printing-surfaces of said printing-disks and means connected with said tape-carrying device for producing an intermittent movement of said tape after each printing act, substantially as and for the purposes set forth.

9. In a cash-register, the actuating hand-levers, the front plate, having a series of slots along which the said levers may be moved in accordance with the values to be indicated, the movable segments substantially independent of but adapted to automatically follow said levers and to have their positions controlled thereby, the registering-wheels, and the indicating-cylinders, combined with a main shaft, a series of independently-acting spindles at the front of the machine, a pinion connected with each spindle, a toothed rack connected with each lever, an intermediately-arranged train of gears between each pinion of said spindles and the rack of each hand-lever, a toothed wheel connected with each spindle, and a toothed printing-disk in mesh with each toothed wheel of said spindles, an oscillating tape-carrying device, and means connected with said main shaft adapted to engage with the said tape-carrying device to bring the tape in its printing relation against the printing-surfaces of said printing-disks, and means connected with said tape-carrying device for producing an intermittent movement of the said tape after each printing act comprising a bracket and a tape-delivering reel, a tape-receiving reel, a ratchet-disk connected with said tape-receiving reel, a pair of movably-connected links between said reels, and a spring-controlled dog on one of said links in engagement with said ratchet-disk, for producing a step-by-step motion of said tape-receiving reel, substantially as and for the purposes set forth.

10. In a cash-register, the actuating hand-levers, the front plate having a series of slots along which the said levers may be moved in accordance with the values to be indicated, the movable segments substantially independent of but adapted to automatically follow said levers and to have their positions controlled thereby, the registering-wheels and the indicating-cylinders, combined with a main shaft, a series of independently-acting spindles at the front of the machine, a pinion connected with each spindle, a toothed rack connected with each hand-lever, an intermediately-arranged train of gears between each pinion of said spindles and the rack of each hand-lever, a toothed wheel connected with each spindle, and a toothed printing-disk in mesh with each toothed wheel of said spindles, an oscillating tape-carrying device on one end of said main shaft, and means on said shaft adapted to engage the said tape-carrying device to bring the tape in its printing relation against the printing-surfaces of said printing-disks, consisting essentially, of a sleeve 139 at the side of said tape device and a cam-sleeve on said main shaft having a projection adapted at a predetermined time to be brought in positive and operative engagement with the said sleeve 139, substantially as and for the purposes set forth.

11. In a cash-register, the actuating hand-levers, the front plate, having a series of slots along which the said levers may be moved in accordance with values to be indicated, the movable segments substantially independent of but adapted to automatically follow said levers and to have their positions controlled thereby, the registering-wheels, and the indicating-cylinders, combined with a main shaft, a series of independently-acting spindles at the front of the machine, a pinion connected with each spindle, a toothed rack connected with each hand-lever, an intermediately-arranged train of gears between each pinion of said spindles and the rack of each hand-lever a toothed wheel connected with each spindle, and a toothed printing-disk in mesh with each toothed wheel of said spindles, an oscillating tape-carrying device on one end of said main shaft, and means on said shaft adapted to engage the said tape-carrying device to bring the tape in its printing relation against the printing-surfaces of said printing-disks, consisting, essentially, of a sleeve 139 at the side of said tape device and a cam-sleeve on said main shaft having a projection adapted at a predetermined time to be brought in positive and operative engagement with the said sleeve 139 and means adapted to be brought in holding engagement with a portion of said tape-carrying device during the printing operation substantially as and for the purposes set forth.

12. In a cash-register, the actuating hand-levers, the front plate having a series of slots along which the said levers may be moved in accordance with values to be indicated, the movable segments substantially independent of but adapted to automatically follow said levers and to have their positions controlled thereby, the registering-wheels, and the indicating-cylinders, combined with a main shaft, a series of independently-acting spindles, at the front of the machine, a pinion connected with each spindle, a toothed rack connected with each hand-lever, an intermediately-arranged train of gears between each pinion of said spindles and the rack of each hand-lever, a toothed wheel connected with each spindle, and a toothed printing-disk in mesh with each toothed wheel of said spindles, an oscillating tape-carrying device on one end of said main shaft and means on said shaft adapted to engage the said tape-carrying device to bring the tape in its printing relation against the printing-surfaces of said printing-disks, consisting, essentially, of a sleeve 139 at the side of said tape device, and a cam-sleeve on said main shaft having a projection adapted at a predetermined time to be brought in positive and operative engagement with the said sleeve 139 and means consisting, essentially of a spring-controlled arm 157, having a slotted yoke portion 158, and an offset adapted to be brought in holding engagement with a portion of said tape-carrying device during the printing operation, substantially as and for the purposes set forth.

13. In a cash-register, the combination, with a set of actuating hand-levers, and the registering and indicating mechanisms, of a series of independently-operating spindles rotatively arranged one within the other, and a toothed pinion connected with each spindle, a toothed rack on each hand-lever, a gear 80 in mesh with each rack, and an idle gear 81 in mesh with each gear 80 and the pinions of said spindles, a set of printing-disks provided with gear-teeth, and a gear-wheel on each spindle in mesh with the respective printing-disk, all arranged so that the movement of a hand-lever when setting said lever will correspondingly set the corresponding printing-disk, substantially as and for the purposes set forth.

14. In a cash-register, the combination with a set of actuating hand-levers, and the registering and indicating mechanism, of a series of independently-operating spindles, rotatively arranged one within the other, and a toothed pinion connected with each spindle, a toothed rack on each hand-lever, a gear 80 in mesh with each rack and an idle gear 81 in mesh with each gear 80 and the pinions of said spindles, a set of printing-disks provided with gear-teeth, and a gear-wheel on each spindle in mesh with the respective printing-disk all arranged so that the movement of a hand-lever when setting said lever will correspondingly set the corresponding printing-disk, an oscillating tape-carrying device, and means connected with said tape-carrying device and controlled by the movement of said main shaft for causing a movement of said tape-carrying device to bring the tape in its printing relation against the printing-surfaces of said printing-disks, substantially as and for the purposes set forth.

15. In a cash-register, the combination, with a set of actuating hand-levers, and the registering and indicating mechanisms, of a series of independently-operating spindles rotatively arranged one within the other, and a toothed pinion connected with each spindle, a toothed rack on each hand-lever a gear 80 in mesh with each rack, and an idle gear 81, in mesh with each gear 80 and the pinions of said spindles, a set of printing-disks provided with gear-teeth, and a gear-wheel on each spindle in mesh with the respective printing-disk, all arranged so that the movement of a hand-lever when setting said lever will correspondingly set the corresponding printing-disk, an oscillating tape-carrying device and means connected with said tape-carrying device and controlled by the movement of said main shaft for causing a movement of said tape-carrying device to bring the tape in its printing relation against the printing-surfaces of said printing-disks and means, connected with said tape-carrying device for producing an intermitted movement of the said tape after each printing act, substantially as and for the purposes set forth.

16. In a cash-register, the combination, with a set of actuating hand-levers and the registering and indicating mechanisms, of a series of independently-operating spindles rotatively arranged one within the other, and a toothed pinion connected with each spindle a toothed rack on each hand-lever, a gear 80 in mesh with each rack, and an idle gear 81 in mesh with each gear 80 and the pinions of said spindles, a set of printing-disks provided with gear-teeth, and a gear-wheel on each spindle in mesh with the respective printing-disk, all arranged so that the movement of a hand-lever when setting said lever will correspondingly set the corresponding printing-disk, an oscillating tape-carrying device, and means connected with said tape-carrying device and controlled by the movement of said main shaft for causing a movement of said tape-carrying device to bring the tape in its printing relation against the printing-surfaces of said printing-disks and means comprising a bracket and a tape-delivering reel, a tape-receiving reel, a ratchet-disk connected with said tape-receiving reel, a pair of movably-connected links between said reels, a spring-controlled dog on one of said links in engagement with said ratchet-disk, for producing a step-by-step motion of said tape-receiving reel, substantially as and for the purposes set forth.

17. In a cash-register, the combination, with the registering and indicating mechanism, and actuating hand-levers, of a main shaft, and a tape-carrying device arranged upon and adapted to oscillate on one end of said shaft, substantially as and for the purposes set forth.

18. In a cash-register, the combination, with the registering and indicating mechanism and actuating hand-levers, of a main shaft, and a tape-carrying device arranged upon and adapted to oscillate on one end of said shaft, a sleeve 139 on one side of the said tape-carrying device, and a cam-sleeve on said shaft, provided with a projection adapted to be brought in engagement with said sleeve 139 and thereby produce an oscillating movement of the said tape-carrying device on said main shaft, substantially as and for the purposes set forth.

19. In a cash-register, the combination, with the registering and indicating mechanism, and actuating hand-levers, of a main shaft, and a tape-carrying device arranged upon and adapted to oscillate on one end of said shaft, an adjustable sleeve 139 on one side of said tape-carrying frame, said sleeve 139 having a recess, and an inking-roll-carrying frame pivotally connected with said tape-carrying device, comprising a downwardly-extending arm 154 having its end portion normally extending into the said recess in said sleeve 139 but adapted to be disengaged from said recess to raise said printing-roll frame in its inactive position, and means on said main shaft adapted to be brought in engagement with a portion of said sleeve 139 and thereby produce an oscillating movement of the said tape-carrying device on said main shaft, substantially as and for the purposes set forth.

20. In a cash-register, the combination, with the registering and indicating mechanism, and actuating hand-levers, of a main shaft, and a tape-carrying device arranged upon and adapted to oscillate on one end of said shaft, an adjustable sleeve 139 on one side of said tape-carrying frame, said sleeve 139 having a recess, and an inking-roll-carrying frame pivotally connected with said tape-carrying device, comprising a downwardly-extending arm 154 having its end portion normally extending into the said recess in said sleeve 139 but adapted to be disengaged from said recess to raise said printing-roll frame in its inactive position and a cam-sleeve on said main shaft, provided with a projection adapted to be brought in engagement with said sleeve 139 and thereby produce an oscillating movement of said tape-carrying device on said main shaft, substantially as and for the purposes set forth.

21. The herein-described tape-carrying device, for a cash-register, comprising a rocking frame, having two side pieces 94 and 101, combined with a tape-delivering reel, a tape-receiving reel, a ratchet-disk connected with said receiving-reel, a pair of pivotally-connected links between said reels, and a spring-dog connected with one of said links and in engagement with the said ratchet-disk to produce an intermittent rotary movement of said tape-receiving reel, a spring-controlled saddle pivotally connected with said side pieces 94 and 101, and an inking-roll in said saddle, substantially as and for the purposes set forth.

22. The herein-described tape-carrying device for a cash-register, comprising a rocking frame having two side pieces 94 and 101, combined with a tape-delivering reel, a tape-receiving reel, and means for actuating said reels to produce an intermittent movement of said tape, a spring-controlled saddle pivotally connected with said side pieces 94 and 101, and an inking-roll in said saddle, substantially as and for the purposes set forth.

23. In a tape-carrying device, of the character herein set forth, a tape-receiving reel 116, comprising a ratchet-disk, a reel 116 connected with said ratchet-disk, said reel having a flat portion 125, and a pin 124 extending from the side of said ratchet-disk directly above the said flat portion of said reel 116 for attachment thereto of the end portion of a tape, substantially as and for the purposes set forth.

24. The combination with a pin 110, of a tape-reel 111, and the wound tape 112 thereon, said reel 111 being provided with a slot 118, and a key 117 in said slot, said key having a straight edge 119 in positive contact with the inner portion of the roll of tape 112, substantially as and for the purposes set forth.

Signed at New York, in the county of New York and State of New York, this 6th day of June, A. D. 1902.

ALBERT PFAFF.

Witnesses:
CHAS. C. GILL,
ARTHUR MARION.